US009247165B2

(12) United States Patent
Sohn (10) Patent No.: US 9,247,165 B2
(45) Date of Patent: Jan. 26, 2016

(54) PIXEL SIGNAL PROCESSING APPARATUS FOR REMOVING NOISE IN AN IMAGE SENSOR HAVING A COLUMN PARALLEL STRUCTURE AND CMOS IMAGE SENSOR USING THE SAME

(71) Applicant: SK hynix Inc., Gyeonggi-do (KR)

(72) Inventor: Young-Chul Sohn, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 174 days.

(21) Appl. No.: 14/052,354

(22) Filed: Oct. 11, 2013

(65) Prior Publication Data

US 2014/0368710 A1 Dec. 18, 2014

(30) Foreign Application Priority Data

Jun. 14, 2013 (KR) .................. 10-2013-0068444

(51) Int. Cl.
*H04N 5/335* (2011.01)
*H04N 5/365* (2011.01)
*H04N 5/374* (2011.01)
*H04N 5/378* (2011.01)

(52) U.S. Cl.
CPC ............. *H04N 5/3658* (2013.01); *H04N 5/374* (2013.01); *H04N 5/378* (2013.01)

(58) Field of Classification Search
CPC ...................................................... H04N 5/357
See application file for complete search history.

(56) References Cited

U.S. PATENT DOCUMENTS

| 8,179,461 | B2 * | 5/2012 | Suzuki et al. | 348/294 |
|---|---|---|---|---|
| 2007/0046803 | A1 * | 3/2007 | Ahn | 348/308 |
| 2007/0229126 | A1 * | 10/2007 | Nam | 327/131 |
| 2009/0160984 | A1 * | 6/2009 | Lee et al. | 348/294 |

FOREIGN PATENT DOCUMENTS

| KR | 100746197 | 8/2007 |
|---|---|---|
| KR | 100803229 | 2/2008 |
| WO | WO 2008018721 A1 * | 2/2008 |

* cited by examiner

*Primary Examiner* — Gary C Vieaux
(74) *Attorney, Agent, or Firm* — IP & T Group LLP (57) ABSTRACT

A CMOS image sensor may include an active pixel sensor suitable for generating a pixel signal corresponding to incident light, a reference pixel array suitable for shielding incident light and generate a reference value, a readout circuit suitable for comparing the pixel signal and the reference value with a ramp signal and for removing a first noise of the pixel signal in a common mode, and a pixel signal processing circuit suitable for performing a linear operation on an output signal from the readout circuit and the reference value, and for removing a second noise of the pixel signal in the common mode.

12 Claims, 7 Drawing Sheets

PIXEL SIGNAL PROCESSING APPARATUS FOR REMOVING NOISE IN AN IMAGE SENSOR HAVING A COLUMN PARALLEL STRUCTURE AND CMOS IMAGE SENSOR USING THE SAME

CROSS-REFERENCE TO RELATED APPLICATIONS

The present application claims priority of Korean Patent Application No. 10-2013-0068444, filed on Jun. 14, 2013, which is incorporated herein by reference in its entirety.

BACKGROUND

1. Field

Exemplary embodiments of the present invention relate to an image sensor, and more particularly, to a pixel signal processing apparatus for removing noise in an image sensor having a column parallel structure and a CMOS image sensor using the same.

2. Description of the Related Art

In a column parallel structure, each comparator of a readout block operates in a differential mode to effectively remove a first noise caused by power supplied to the comparator in a common node.

However, row-to-row noise or a second noise occurring in a pixel due to power supplied to the pixel is contained in a pixel signal and then applied to the readout block. Thus, pixel data including the row-to-row noise is output without removal of the row-to-row noise, which causes row-to-row fluctuation or row-to-row shading in the pixel data.

SUMMARY

Various embodiments are directed to a complementary metal-oxide semiconductor (CMOS) image sensor in which dummy pixels or reference pixels for sensing a common mode of pixels are added to row lines to remove a row-to-row noise or a second noise occurring in pixels due to power supplied to the pixels in the common mode, and a readout block is implemented in a differential manner to remove a first noise caused by power supplied to comparators in the common mode.

Also, various embodiments are directed to a pixel signal processing apparatus for removing a row-to-row noise or a second noise occurring in pixels due to power supplied to the pixels in the common mode.

In an embodiment, a CMOS image sensor may include an active pixel sensor suitable for generating a pixel signal corresponding to incident light, a reference pixel array suitable for shielding incident light and generate a reference value, a readout circuit suitable for comparing the pixel signal and the reference value with a ramp signal and for removing a first noise of the pixel signal in a common mode and a pixel signal processing circuit suitable for performing a linear operation on an output signal from the readout circuit and the reference value and for removing a second noise of the pixel signal in the common mode.

In an embodiment, a pixel signal processing apparatus may include a demultiplexing unit suitable for demultiplexing a signal including a pixel signal, a first reference value and a second reference value, a first calculation unit suitable for calculating a difference between the first reference value and the second reference value, and a second calculation unit suitable for applying a weight to the pixel signal based on the difference between the first reference value and the second reference value and for calculating a difference between the pixel signal and the difference between the first reference value and the second reference value.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like numbered parts in the various figures and embodiments of the present invention.

The drawings are not necessarily to scale and in some instances, proportions may have been exaggerated in order to clearly illustrate features of the embodiments.

In this disclosure, when one part is referred to as being 'connected' to another part, it should be understood that the former can be 'directly connected' to the latter, or 'electrically connected' to the latter via an intervening part. Furthermore, when it is described that one comprises, includes or has some elements, it should be understood that it may comprise, include or have only those elements, or it may comprise, include or have other elements as well as those elements if there is no specific limitation. The terms of a singular form may include plural forms unless referred to the contrary.

Figure 1:
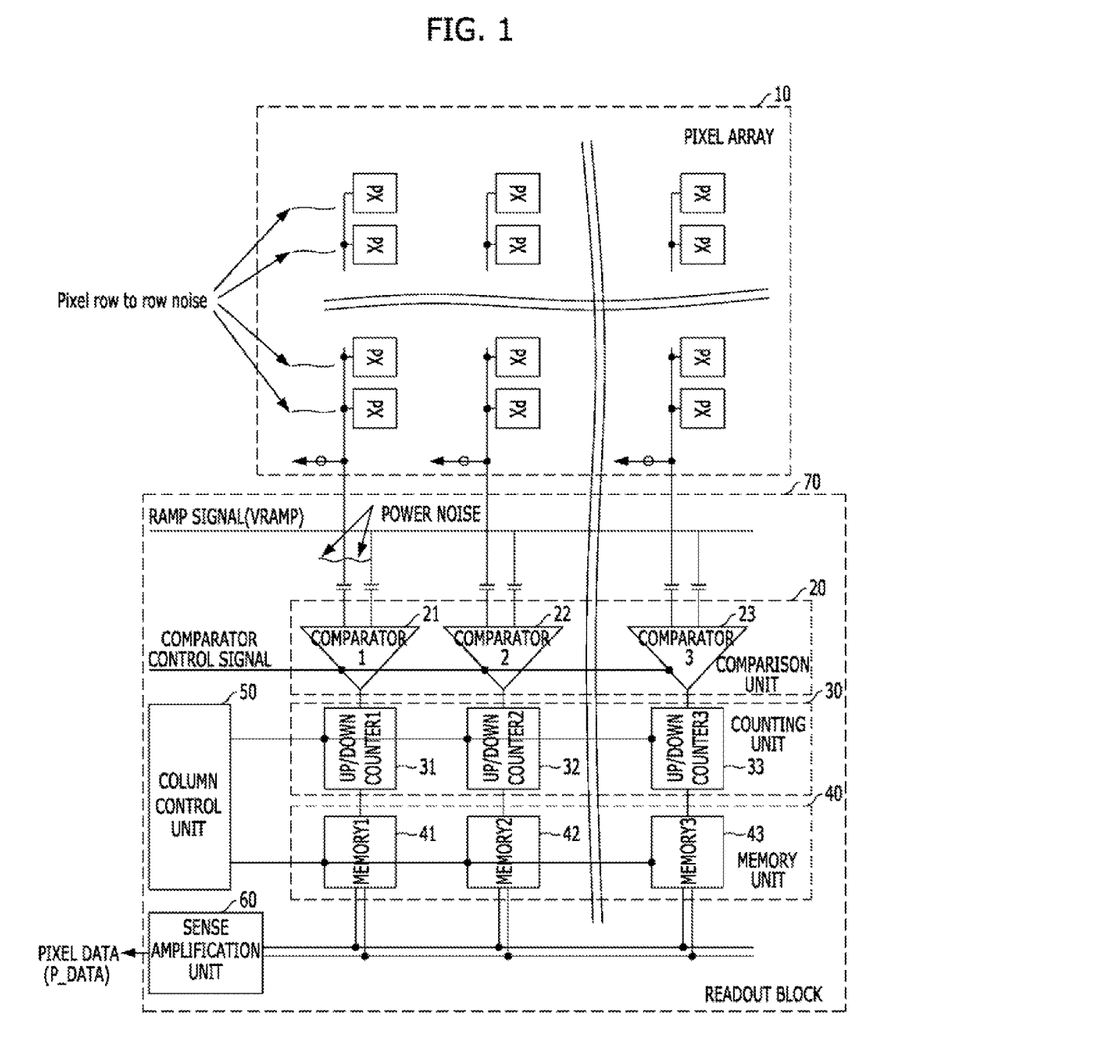
FIG. 1 is a diagram illustrating a pixel array and a readout block of a CMOS image sensor.

FIG. 1 is a diagram illustrating a pixel array and a readout block of a CMOS image sensor. FIG. 1 illustrates a general column parallel structure.

Referring to FIG. 1, the CMOS image sensor includes a pixel array 10 and a readout block 70. The pixel array 10 is configured to output a pixel signal corresponding to incident light. The readout block 70 includes a comparison unit 20, a counting unit 30, a memory unit 40, a column control unit 50, and a sense amplification unit 60.

The comparison unit 20 is configured to compare the pixel signal outputted from the pixel array 10 with a ramp signal VRAMP applied from an external voltage generator (not illustrated) according to a comparator control signal COM- P_CTRL received from an external CIS controller (not illustrated). The counting unit 30 is configured to count an output signal of the comparison unit 20. The memory unit 40 is configured to store counting information provided from the counting unit 30. The column control unit 50 is configured to control the operations of the counting unit 30 and the memory unit 40. The sense amplification unit 60 is configured to amplify a signal corresponding to data outputted from the memory unit 40 and output pixel data P_DATA.

The comparison unit 20 includes a plurality of comparators 21 to 23, the counting unit 30 includes a plurality of up/down counter 31 to 33, and the memory unit 40 includes a plurality of memories 41 to 43. The counting unit 30 may be implemented with memories instead of the up/down counters 31 to 33.

The analog-digital conversion operation of the CMOS image sensor will be described. In the following descriptions, one comparator 21, one up/down counter 31, and one memory 41 will be described as an example.

The comparator 21 in a normal mode receives a pixel signal outputted from a column pixel of the pixel array 10 and the ramp signal VRAMP applied from the external voltage generator and compares the values of the two signals in response to the comparator control signal COMP_CTRL received from the external CIS controller.

As the voltage level of the ramp signal VRAMP decreases with time, there is a time point when the values of the two signals inputted to the comparator 21 coincide with each other. After the time point at which the values of the two signals coincide with each other, a value outputted from the comparator 21 is inverted.

The up/down counter 31 counts the output of the comparator 21 from the time point at which the ramp signal VRAMP decreases to the time point at which the output of the comparator 21 is inverted.

The memory 41 stores the value counted by the up/down counter 31, that is, the counting information.

The column parallel structure described above includes an analog-to-digital converter (ADC) provided for corresponding column.

The column parallel structure performs counting until each comparator compares a pixel signal outputted from each pixel with the ramp signal VRAMP applied from the external voltage generator in response to the comparator control signal COMP_CTRL received from the external CIS controller and judges the comparison result, and then the column parallel structure outputs the counting value.

Each comparator may operate in a differential mode and effectively remove a first noise caused by power supplied to the comparator through a common node.

As described above, each comparator of the readout block in the column parallel structure may efficiently remove the first noise. However, since row-to-row noise or a second noise occurring in a pixel due to power supplied to the pixel is contained in a pixel signal and then applied to the readout block, pixel data including the row-to-row noise is output without removal of the row-to-row noise, which causes row-to-row fluctuation or row-to-row shading in the pixel data.

Therefore, the embodiments of the present invention propose dual common mode rejection (DCR). According to the DCR, a dummy pixel, that is, a reference pixel is added to a row line to sense a common mode of a pixel and to remove in the common mode row-to-row noise or the second noise occurring in a pixel due to power supplied to the pixel, and the readout block is implemented in a differential mode to remove in the common mode the first noise caused by power supplied to a comparator. This will be described in detail with reference to FIGS. 2 to 7.

Figure 2:
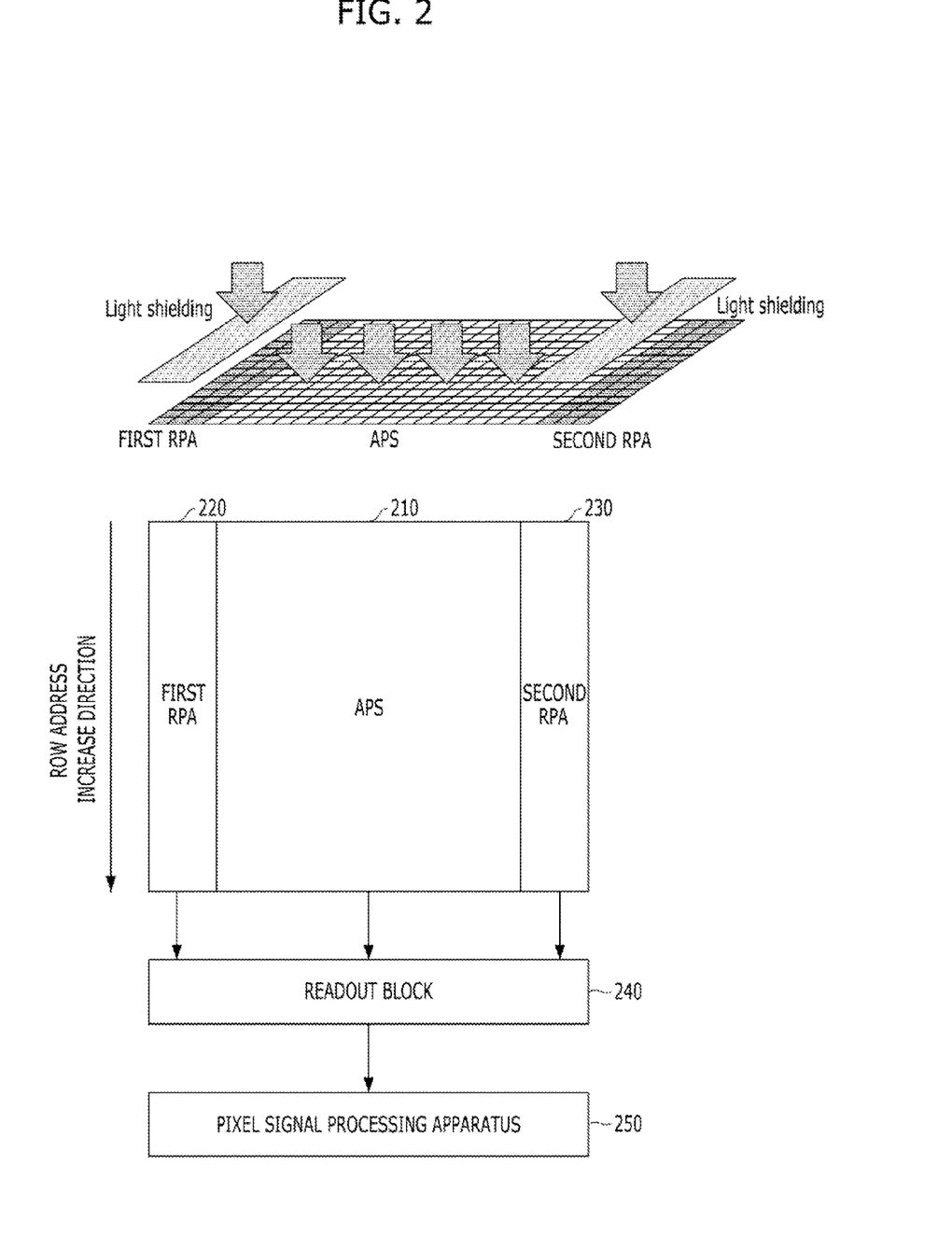
FIG. 2 is a block diagram of a CMOS image sensor in accordance with an embodiment of the present invention.

FIG. 2 is a block diagram of a CMOS image sensor in accordance with an embodiment of the present invention.

Referring to FIG. 2, the CMOS image sensor in accordance with the embodiment of the present invention may include an active pixel sensor (APS) 210, reference pixel arrays (RPAs) 220 and 230, a readout block 240, and a pixel signal processing apparatus 250.

The APS 210 is configured to generate a pixel signal corresponding to incident light. The RPAs 220 and 230 are configured to shield incident light and generate a reference value or black level for sensing a common mode. The readout block 240 is configured to compare in a differential mode the pixel signal outputted from the APS 210 and the reference value outputted from the RPAs 220 with a ramp signal VRAMP to remove the first noise in the common mode and output pixel data. The pixel signal processing apparatus 250 is configured to perform a linear operation on the value of the pixel signal contained in the pixel data outputted from the readout block 240 and the reference value to remove the second noise in the common mode and output final pixel data.

The APS 210 may include a plurality of pixels having the same structure as the pixels of the pixel array 10 shown in FIG. 1. The APS 210 may generate image information or pixel signal corresponding to light incident from outside and output the generated image information to the readout block 240.

The RPAs 220 and 230 may shield light incident from outside, generate a predetermined reference value or black level, and output the generated reference value or black level to the readout block 240. The RPAs 220 and 230 may include a first RPA 220 and a second RPA 230. The first RPA 220 may include first reference pixels provided in one side, for example, left side of the APS 210 so that each of the first reference pixels corresponds to respective one of row lines of the APS 210, and the second RPA 230 may include second reference pixels provided in the other side, for example, right side of the APS 210 so that each of the second reference pixels corresponds to respective one of row lines of the APS 210. The pixels of the RPAs 220 and 230 may be implemented with various structures, and this will be described below with reference to FIGS. 3A to 3C.

The readout block 240 may convert the pixel signal outputted from the APS 210 and the reference values outputted from the RPAs 220 and 230 into digital codes and output pixel data to the pixel signal processing apparatus 250. The readout block 240 may be the readout block 70 described with reference to FIG. 1.

The pixel signal processing apparatus 250 may calculate a difference between the first and second reference values in the pixel data outputted from the readout block 240, may apply a weight to the value of the pixel signal, may calculate a difference between the pixel signal and the reference value, and may output final pixel data. The detailed configuration and operation of the pixel signal processing apparatus 250 will be described in detail with reference to FIG. 6.

In accordance with the embodiment of the present invention using the dual common mode rejection (DCR), dummy pixels or reference pixels for sensing the common mode of pixels are added to the row lines to remove in the common mode the row-to-row noise or the second noise occurring in the pixels due to power supplied to the pixels and the readout block is implemented in a differential mode to effectively remove in the common mode the first noise caused by power supplied to comparators. Thus, row noise of the image information may be reduced in a two-dimensional manner.

Figure 3A:
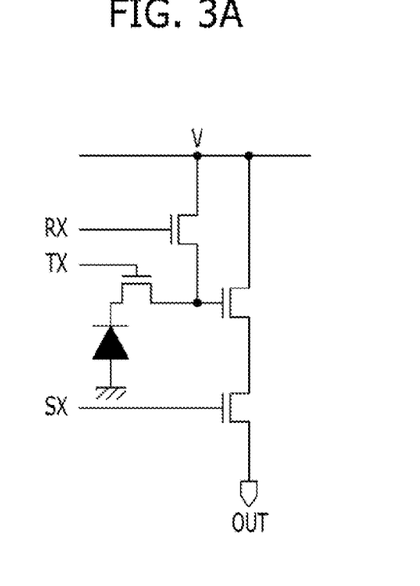
FIGS. 3A to 3C are circuit diagrams of pixels of a reference pixel array (RPA) in accordance with the embodiment of the present invention.
Figure 3B:
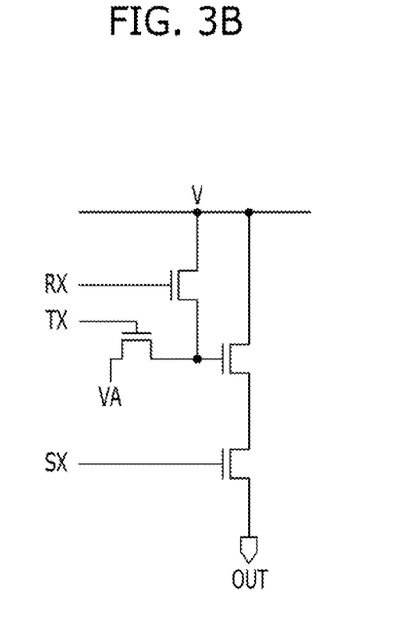
Figure 3C:
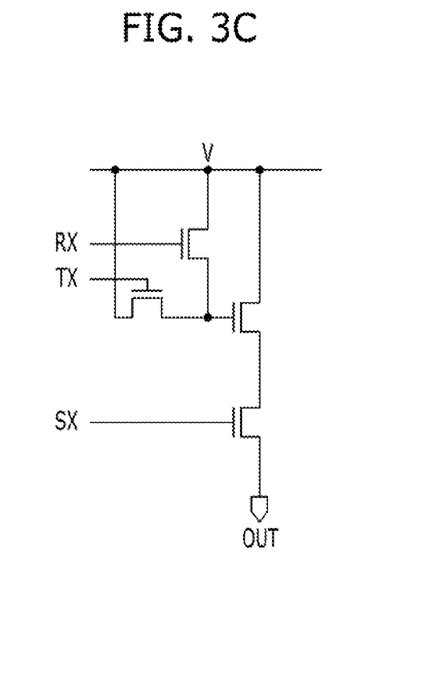

FIGS. 3A to 3C are circuit diagrams illustrating pixels of the RPA in accordance with the embodiment of the present invention.

Referring to FIGS. 3A to 3C, the pixels of the RPA may be implemented in various types such as A type, B type, and C type depending on pixel design.

The A-type pixel illustrated in FIG. 3A has a structure implemented with a photodiode in the same manner as an active pixel of the APS. Since this structure is well known, the detailed descriptions thereof are omitted herein.

The B-type pixel illustrated in FIG. 3B includes a transfer transistor having a drain to receive a predetermined reference voltage VA. Since the other components of the B-type pixel are well known, the detailed descriptions thereof are omitted herein.

The C-type pixel illustrated in FIG. 3C includes a transfer transistor having a drain to receive a voltage V supplied to a corresponding reference pixel. Since the other components of the C-type pixel are well known, the detailed descriptions thereof are omitted herein.

Figure 4:
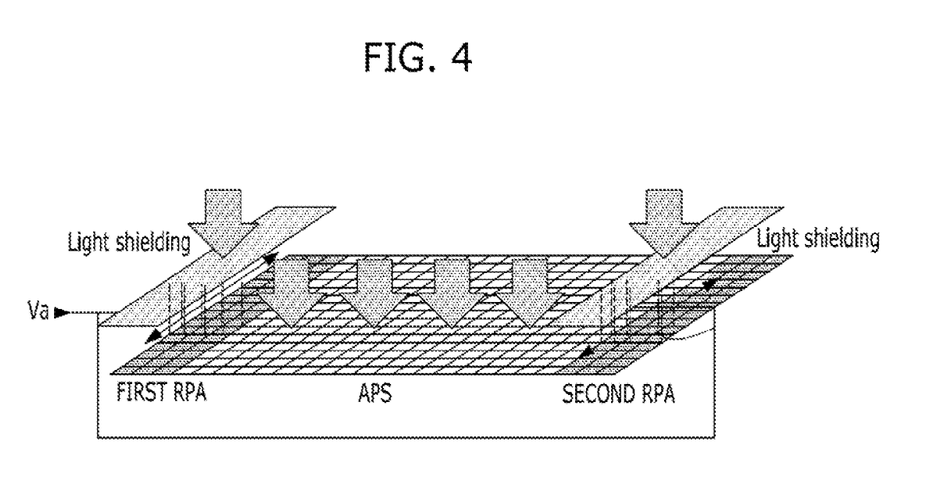
FIG. 4 is a diagram for illustrating an embodiment of a B-type pixel of FIG. 3B.

FIG. 4 is a diagram for illustrating an embodiment of the B-type pixel of FIG. 3B.

FIG. 4 illustrates a predetermined reference voltage VA applied to a metal for light shielding and supplied to the drain of the transfer transistor of the B-type pixel of FIG. 3B. The predetermined reference voltage VA may be applied to the metal for light shielding and supplied to a source of the transfer transistor.

Figure 5:
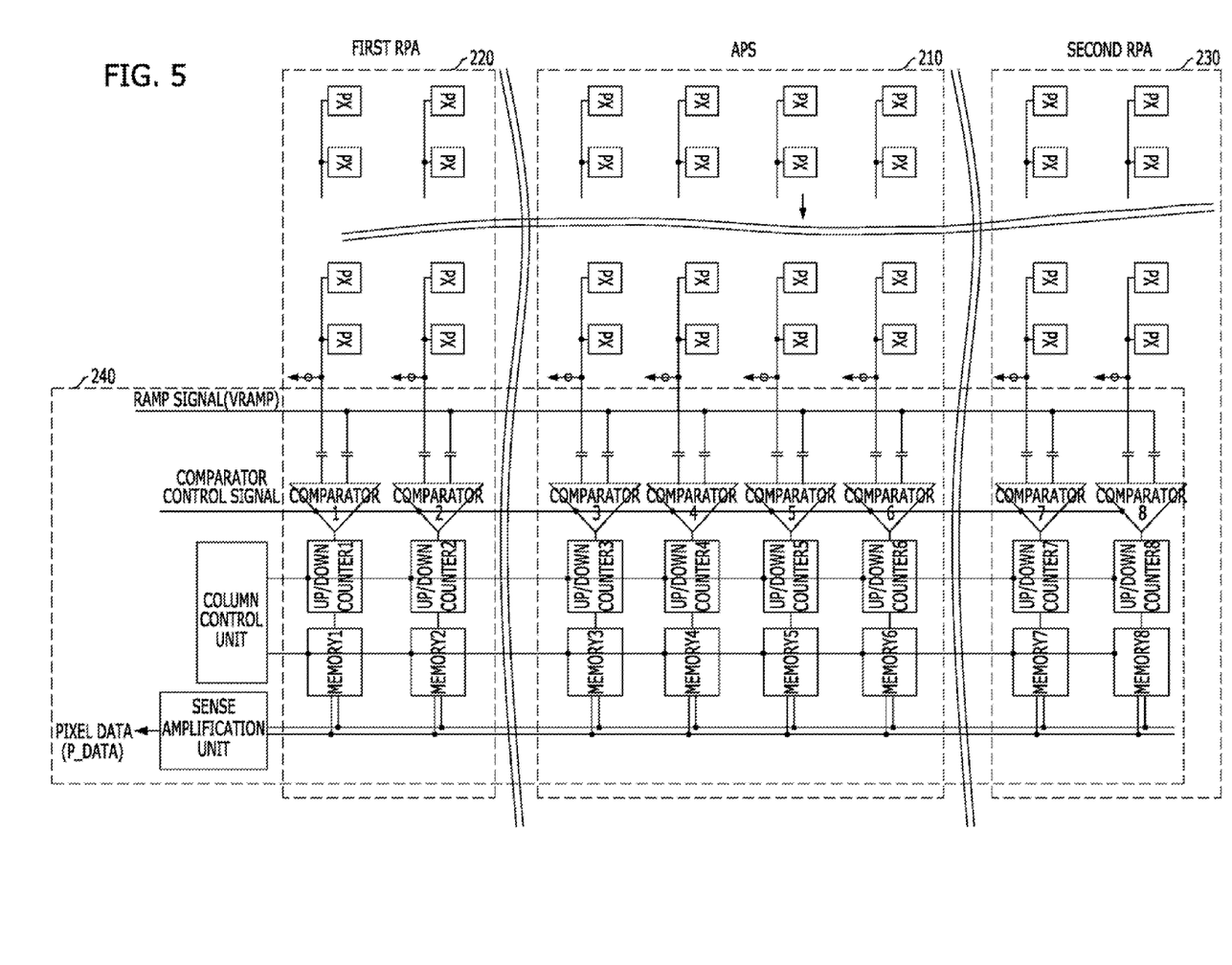
FIG. 5 is a diagram illustrating connection relationship among an active pixel sensor (APS), RPAs, and a readout block in accordance with the embodiment of the present invention.

FIG. 5 is a diagram illustrating connection relationship among the APS 210, the RPAs 220 and 230, and the readout block 240 in accordance with the embodiment of the present invention.

Referring to FIG. 5, the readout block 240 may include an ADC configured to compare in a differential mode the value of the pixel signal outputted from the APS 210 and the reference values outputted from the first and second RPAs 220 and 230 with the ramp signal VRAMP and convert the pixel signal and the reference values into digital codes.

The readout block 240 may compare the value of the pixel signal outputted from the APS 210 and the reference values outputted from the first and second RPAs 220 and 230 with the value of the ramp signal VRAMP, may perform counting until the comparators judge the results and may output data. The comparators may be designed in a differential manner to remove the first noise in the common mode. The readout block 240 may convert the value of the pixel signal outputted from the APS 210 and the reference values outputted from the first and second RPAs 220 and 230 into digital codes through the analog-digital conversion operation and may output the pixel data to the pixel signal processing apparatus 250.

Figure 6:
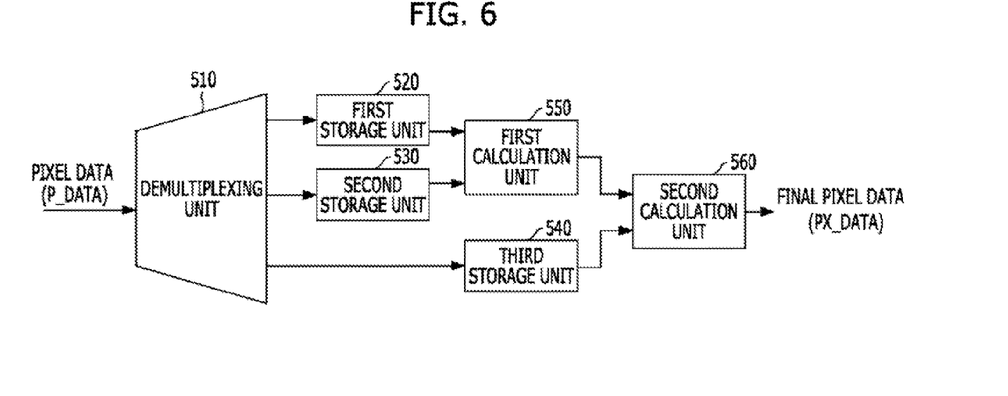
FIG. 6 is a block diagram of a pixel signal processing apparatus in accordance with an embodiment of the present invention.

FIG. 6 is a block diagram of a pixel signal processing apparatus 250 in accordance with an embodiment of the present invention.

Referring to FIG. 6, the pixel signal processing apparatus 250 in accordance with the embodiment of the present invention may include a demultiplexing unit 510, a first storage unit 520, a second storage unit 530, a third storage unit 540, a first calculation unit 550, and a second calculation unit 560.

The demultiplexing unit 510 is configured to demultiplex the pixel data outputted from a readout block 240. The first storage unit 520 is configured to store a first reference value demultiplexed by the demultiplexing unit 510. The second storage unit 530 is configured to store a second reference value demultiplexed by the demultiplexing unit 510. The third storage unit 540 is configured to store a value of a pixel signal demultiplexed by the demultiplexing unit 510. The first calculation unit 550 is configured to calculate a difference between the first and second reference values from the first and second storage units 520 and 530. The second calculation unit 560 is configured to apply a weight to the value of the pixel signal provided from the third storage unit 540 according to the difference between the first and second reference values calculated by the first calculation unit 550, to calculate a difference between the values of the pixel signal and the output signal from the first calculation unit 550, and to output final pixel data.

The first storage unit 520, the second storage unit 530, and the third storage unit 540 are optional. The first and second reference values demultiplexed by the demultiplexing unit 510 may be directly transmitted to the first calculation unit 550, and the value of the pixel signal multiplexed by the demultiplexing unit 510 may be directly transmitted to the second calculation unit 560.

The first storage unit 520, the second storage unit 530, and the third storage unit 540 may be implemented with registers, for example. The first calculation unit 550 may include a modulator, and the second calculation unit 560 may include an arithmetic and logic unit (ALU).

The operation of the pixel signal processing apparatus 250 in accordance with the embodiment of the present invention will be described below.

When a row of an n-th address is read, the APS 210 and the first and second RPAs 220 and 230 are simultaneously sampled and read by the readout block 240. Since the column parallel structure reads all of the pixels of one row at the same time, the entire first noises of all of the pixels of a row such as power noise are sampled and read in the same manner in the APS 210 and the first and second RPAs 220 and 230.

The sampled data are converted into a digital code through an analog-digital conversion operation of the readout block 240 and then stored in the respective memories of the readout block 240, and the pixel data are read out according to a column address.

For example, suppose that pixel data are read according to a column address in order of the first RPA 220, the second RPA 230, and the APS 210. Then, when the pixel data stored in a memory are outputted according to the column address, the demultiplexing unit 510 demultiplexes the pixel data in order of the first reference value, the second reference value, and the pixel signal, and the demultiplexed data are sequentially stored in the first storage unit 520, the second storage unit 530, and the third storage unit 530. Then, the first and second calculation units 550 and 560 perform a linear operation on the pixel data.

Figure 7A:
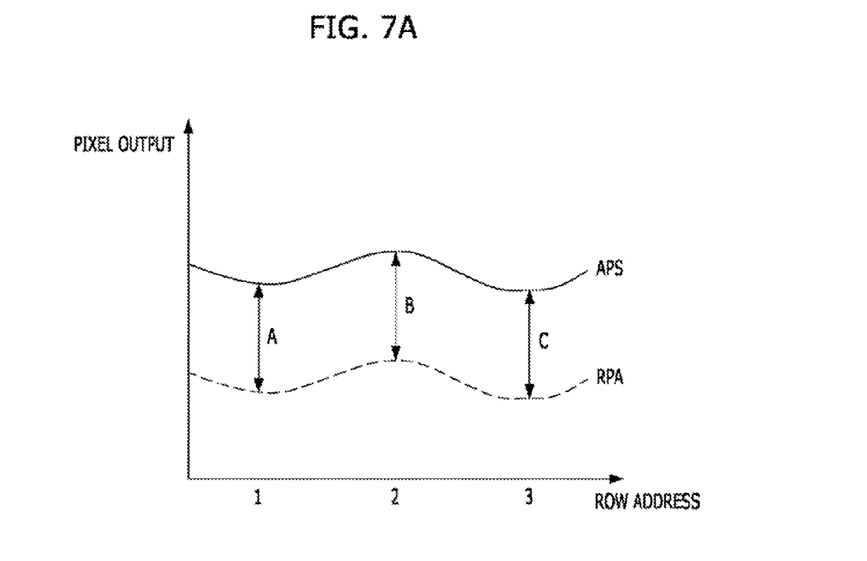
FIGS. 7A and 7B are charts illustrating row characteristics of an APS and first and second RPAs in accordance with an embodiment of the present invention.
Figure 7B:
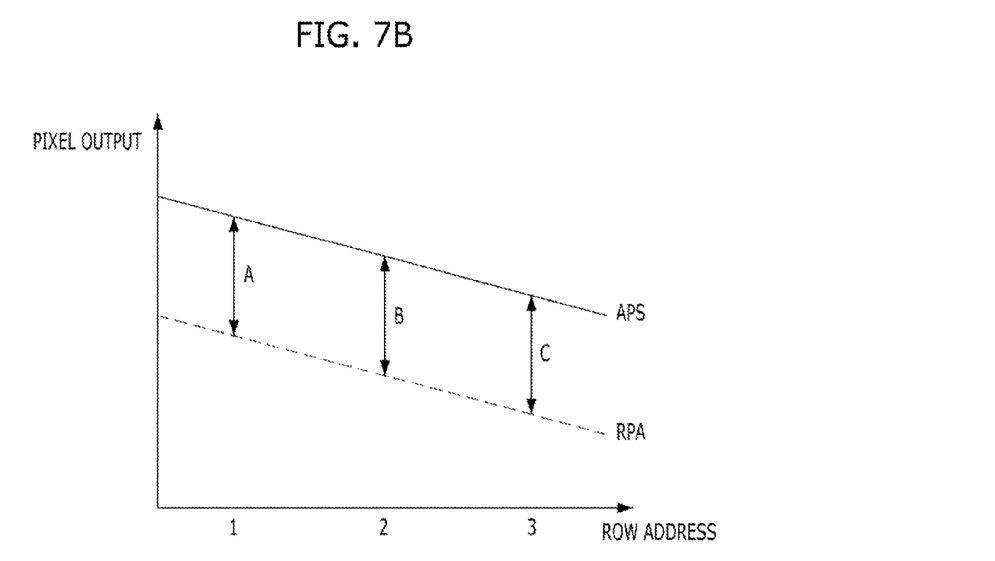

FIGS. 7A and 7B are charts illustrating row characteristics of the APS and the first and second RPAs in accordance with the embodiment of the present invention.

As described above, since the APS 210 and the first and second RPAs 220 and 230 are positioned at the same row line, the value of the pixel signal and the first and second reference values are read under the same situation. Furthermore, the first and second RPAs 220 and 230 reflect only a dark current of the APS because light is not incident. Thus, row-to-row fluctuation may occur as illustrated in FIG. 7A, or row-to-row shading may occur as illustrated in FIG. 7B. Therefore, when the second calculation unit 560 calculates a difference between the values of the pixel signal and the output signal from the first calculation unit 550, a constant value may be obtained. For example, suppose that a delta value of a first row is set to 'A', a delta value of a second row is set to 'B', and a delta value of a third row is set to C', when the first to third rows are read at a constant illumination as illustrated in FIG.

7A. Then, since the values 'A', 'B', and 'C' are outputted as final pixel data, almost the same characteristics may be realized.

Figure 8:
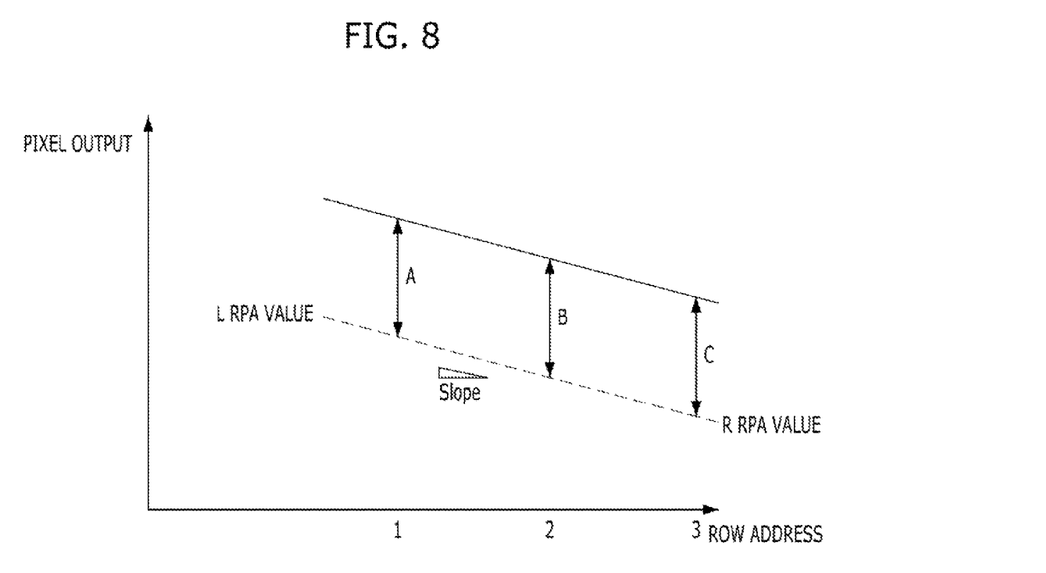
FIG. 8 is a chart illustrating an operation of a first calculation unit in accordance with the embodiment of the present invention.

FIG. 8 is a chart illustrating an operation of the first calculation unit in accordance with the embodiment of the present invention.

The reference value of an RPA may depend on the type of pixels constituting the RPA, peripheral circuits around the RPA, and position of the RPA. Thus, a difference between the first and second reference values may be calculated through a slope obtained from the first and second reference values.

That is, the first calculation unit 550 may calculate the first reference value, i.e., 'L RPA VALUE' of FIG. 8, and the second reference value, i.e., 'R RPA VALUE' of FIG. 8, at two pixels of each of the first and second RPAs 220 and 230, may calculate a slope using the first and second reference values, and may calculate a difference between the first and second reference values. Then, the first calculation unit 550 may perform weighting according to a column address.

The first calculation unit 550 may weight the value of the APS according to the calculated slope, thereby compensating for shading which occurs at the left side and the right side.

In accordance with the embodiments of the present invention, the comparators are implemented in a differential manner, and the RPA is provided for each row. Thus, it is possible to effectively remove the first noise occurring in the readout block 240 and the second noise occurring in the pixels.

The above-described embodiments of the present invention may be applied to an image sensor using the column parallel structure.

In accordance with the embodiments of the present invention, the row-to-row noise or the second noise occurring in pixels due to power supplied to the pixels may be effectively removed in the common mode.

That is, the row-to-row fluctuation occurring in the pixel data may be removed, and the row-to-row shading may be compensated and prevented.

Furthermore, the dummy pixels or the reference pixels for sensing a common mode of pixels may be added to row lines to remove the row-to-row noise or the second noise occurring in pixels due to power supplied to the pixels in the common mode, and the readout block may be implemented in a differential manner to remove the first noise caused by power supplied to comparators in the common mode.

Although various embodiments have been described for illustrative purposes, it will be apparent to those skilled in the art that various changes and modifications may be made without departing from the spirit and scope of the invention as defined in the following claims.

What is claimed is:

1. A CMOS image sensor comprising:
an active pixel sensor suitable for generating a pixel signal corresponding to incident light;
a reference pixel array suitable for shielding incident light and generate a reference value;
a readout circuit suitable for comparing the pixel signal and the reference value with a ramp signal and removing a first noise of the pixel signal in a common mode; and
a pixel signal processing circuit suitable for performing a linear operation on an output signal from the readout circuit and the reference value and removing a second noise of the pixel signal in the common mode,
wherein the pixel signal processing circuit calculates a difference between a first reference value and a second reference value included in the output signal from the readout circuit, applies a weight to the pixel signal and calculates a difference between the pixel signal and the difference between the first reference value and second reference value.

2. The CMOS image sensor of claim 1, wherein the reference pixel array comprises:
a first reference pixel array having first reference pixels provided in one side of the active pixel sensor so that each of the first reference pixels corresponds to respective one of row lines of the active pixel sensor, respectively; and
a second reference pixel array having second reference pixels provided in the other side of the active pixel sensor so that each of the second reference pixels correspond to the respective one of row lines of the active pixel sensor.

3. The CMOS image sensor of claim 2, wherein the first and second reference pixels have the same structure as pixels of the active pixel sensor.

4. The CMOS image sensor of claim 2, wherein each of the first and second reference pixels includes a transfer transistor for directly receiving a predetermined reference voltage through a drain thereof.

5. The CMOS image sensor of claim 4, wherein the transfer transistor further receives the predetermined reference voltage through a metal for light shielding disposed on the reference pixel array.

6. The CMOS image sensor of claim 2, wherein each of the first and second reference pixels includes a transfer transistor for receiving a corresponding voltage through a drain thereof.

7. A CMOS image sensor comprising:
an active pixel sensor suitable for generating a pixel signal corresponding to incident light;
a reference pixel array suitable for shielding incident light and generate a reference value;
a readout circuit suitable for comparing the pixel signal and the reference value with a ramp signal and for removing a first noise of the pixel signal in a common mode; and
a pixel signal processing circuit suitable for performing a linear operation on an output signal from the readout circuit and the reference value and for removing a second noise of the pixel signal in the common mode,
wherein the pixel signal processing circuit comprises:
a demultiplexing unit suitable for demultiplexing the output signal from the readout circuit;
a first calculation unit suitable for calculating a difference between a first reference value and a second reference value demultiplexed by the demultiplexing unit; and
a second calculation unit suitable for applying a weight to the pixel signal demultiplexed by the demultiplexing unit according to the difference output from the first calculation unit and calculate a difference between the pixel signal and the difference output from the first calculation unit.

8. The CMOS image sensor of claim 7, further comprising:
a first storage unit suitable for storing the first reference value demultiplexed by the demultiplexing unit;
a second storage unit suitable for storing the second reference value demultiplexed by the demultiplexing unit; and
a third storage unit suitable for storing the pixel signal demultiplexed by the demultiplexing unit.

9. The CMOS image sensor of claim 8, wherein the first calculation unit calculates a slope based on the first and second reference values provided from the first and second storage units and calculates the difference between the first and second reference values.

10. A pixel signal processing apparatus comprising:
- a demultiplexing unit suitable for demultiplexing a signal including a pixel signal and a first reference value and a second reference value;
- a first calculation unit suitable for calculating a difference between the first reference value and the second reference value; and
- a second calculation unit suitable for applying a weight to the pixel signal according to the difference between the first reference value and the second reference value and calculate a difference between the pixel signal and the difference between the first reference value and the second reference value.

11. The pixel signal processing apparatus of claim 10, further comprising:
- a first storage unit suitable for storing the first reference value;
- a second storage unit suitable for storing the second reference value; and
- a third storage unit suitable for storing the pixel signal.

12. The pixel signal processing apparatus of claim 11, wherein the first calculation unit calculates a slope based on the first and second reference values provided from the first and second storage units and calculates the difference between the first and second reference values.

* * * * *